(12) United States Patent
Yabe et al.

(10) Patent No.: US 7,726,449 B2
(45) Date of Patent: Jun. 1, 2010

(54) DAMPER ASSEMBLY WITH TORQUE LIMITER

(75) Inventors: Hiroshi Yabe, Fukuroi (JP); Dai Okamura, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/014,521

(22) Filed: Dec. 14, 2001

(65) Prior Publication Data
US 2002/0092715 A1     Jul. 18, 2002

(30) Foreign Application Priority Data
Dec. 14, 2000   (JP) .............................. 2000-379979

(51) Int. Cl.
*B60T 7/12*   (2006.01)
(52) U.S. Cl. .................... 188/130; 74/445; 192/208; 464/68.3
(58) Field of Classification Search .................. 74/445; 192/70.17, 203, 208; 464/7, 24, 68; 188/130, 188/378–380
See application file for complete search history.

(56) References Cited

U.S. PATENT DOCUMENTS

| 4,585,427 | A | * | 4/1986 | Lamarche | ................... | 192/213 |
|---|---|---|---|---|---|---|
| 4,850,932 | A | * | 7/1989 | Kagiyama et al. | ........... | 192/205 |
| 4,874,350 | A | * | 10/1989 | Casse et al. | .................. | 192/205 |
| 4,947,700 | A | | 8/1990 | Kern et al. | ..................... | 74/445 |
| 5,104,356 | A | * | 4/1992 | Paquin et al. | ................ | 192/207 |
| 5,269,198 | A | * | 12/1993 | Fukushima | .................. | 192/208 |
| 5,680,918 | A | * | 10/1997 | Reik et al. | .................. | 192/55.1 |
| 6,287,205 | B1 | * | 9/2001 | Bonfilio et al. | ........... | 192/214.1 |

* cited by examiner

*Primary Examiner*—Pam Rodriguez
(74) *Attorney, Agent, or Firm*—Miles & Stockbridge P.C.

(57) ABSTRACT

An airtight damper, an input axis, and a flywheel are mounted to the input axis with a bolt. A torque transmitter, a torque transmitter attachment unit of the flywheel, and a support plate are united with each other using a bolt. The torque transmitter includes a spline unit. A pressure plate engaged with the spline unit is pressed by a pressure spring so as to press a friction plate and a torque transmitter plate against the support plate. Since the torque transmitter plate is fixed to a drive plate by a rivet, the torque from the input axis can be transmitted to the drive plate. Although the torque from the engine is larger than an allowable value, a friction member can slip at a constant torque depending on the pressure of the pressure spring, thereby protecting the damper against an excess load.

10 Claims, 5 Drawing Sheets

DAMPER ASSEMBLY WITH TORQUE LIMITER

BACKGROUND OF THE INVENTION

1. Field of the Invention

The present invention relates to a damper assembly with a torque limiter which is provided between an engine and a transmission so as to protect a damper against an excess load.

2. Related Background Art

A damper assembly drives a driven member from a driving member directly coupled to an engine through a torsion spring. With the configuration, the torsion spring adheres to an overload generated by a combustion of an engine. As a result, the spring is possibly fatigued or damaged. Therefore, the damper assembly has conventionally been provided with an engagement portion in a predetermined position of each member of a driving member, a driven member driven through a torsion spring, an intermediate for separating a torsion spring, etc. so that the relative rotation between the members can be limited, and the torsion spring can be successfully protected against an excess load.

FIG. 4 is a front view showing each component of a prior damper assembly 10 as appropriately exploded. FIG. 5 is a sectional view along V-V shown in FIG. 4. FIG. 6 is a front view showing the maximum state of operation similar to FIG. 1. In the drawings, reference numeral 1 denotes a front cover; 2 denotes a rear cover; and 3 denotes a drive plate directly coupled to the output axis (shaft) of an engine. The drive plate 3 corresponds to the driving member of a damper. Reference numeral 5 denotes a retainer plate for receiving a torsion spring 80 for the drive plate 3; and 7 denotes a hub fixed to the retainer plate with a rivet 11. The combination of the retainer plate 5 and the hub 7 corresponds to the driven member.

Reference numeral 6 denotes a divider ring for dividing the torsion spring 80, and is attached around a outer periphery of the hub 7 for predetermined relative movement. Reference numeral 31 denotes a spring space of the drive plate 3; 32 denotes a shoulder portion formed in a predetermined position; 33 denotes a spring receiver; and 51 denotes a spring receiver of the retainer plate 5 for cooperation with the spring receiver 33 of the drive plate 3 to perform a pressing operation through the torsion spring 80.

The torsion spring 80 is divided by a projecting portion 61 of the divider ring 6. In the example, shown in the drawings, there are three sets of torsion springs 80 between the drive plate 3 and the retainer plate 5. However, since they are divided by the divider ring 6, it is assumed that there are 6 sets of torsion springs 80 in total. In the example shown in the attached drawings, the torsion spring 80 includes three springs, that is, an outermost spring 81, a central spring 82, and a innermost spring 83. The divider ring 6 corresponds to the intermediate member. In the drawings, reference numeral 21 denotes a rivet hole; 22 denotes a positioning hole; and 23 denotes a weld portion.

By dividing the torsion spring 80, the length of the spring can be shortened, and the spring can be arranged along the circumference as shown in the attached drawings although each set of the springs is a linear spring, thereby attaining smooth and accurate operations of the springs.

In the attached drawings, the device is designed to rotate in the arrow R (counterclockwise) direction. When the drive plate 3 rotates with the output of the engine, the retainer plate 5 and the hub 7 fixed thereto are driven through the torsion spring 80 and the divider ring 6, and power is obtained from the output axis attached through a spline 73 of the hub 7.

The front cover 1 and the rear cover 2 are fixed to the drive plate 3, which is a driving member, with the weld portion 23, etc., and a retainer cover plate 4 is fixed to the retainer plate 5, thereby realizing effective seal with space formed therein. A viscous medium such as grease, oil, etc. is filled inside as a lubricant so that the viscous damping resistance can be allowed for the relative movement among the intermediate members such as a torsion spring, the divider ring 6, etc. and the driven member such as the retainer plate 5, etc., thereby suppressing the generation of wear and noise.

When a load on the damper assembly becomes large, the shoulder portion 32 of the drive plate 3 is engaged with a shoulder portion 62 provided in the projecting portion 61 of the divider ring 6 as shown in FIG. 6, and a shoulder portion 64 formed in an inner projecting portion 63 of the divider ring 6 is engaged with a shoulder portion 72 formed in a projecting portion 71 of the hub 7, thereby preventing the torsion spring 80 from closely adhering.

Recently, there is an increasing demand for a smaller device to be mounted in a smaller space with larger output engine. Therefore, the damper necessarily happens to be subject to excess torque, thereby causing a heavy damage. Therefore, it is an object of the present invention is to provide a damper assembly with torque limiter with a proper means for protecting the damper against excess torque.

SUMMARY OF THE INVENTION

The present invention has been developed to solve the above mentioned problems, and provides a damper assembly with a torque limiter characterized by a friction torque limiter provided between an input axis or an output axis and an airtight damper.

DETAILED DESCRIPTION OF THE PREFERRED EMBODIMENTS

Figure 1:
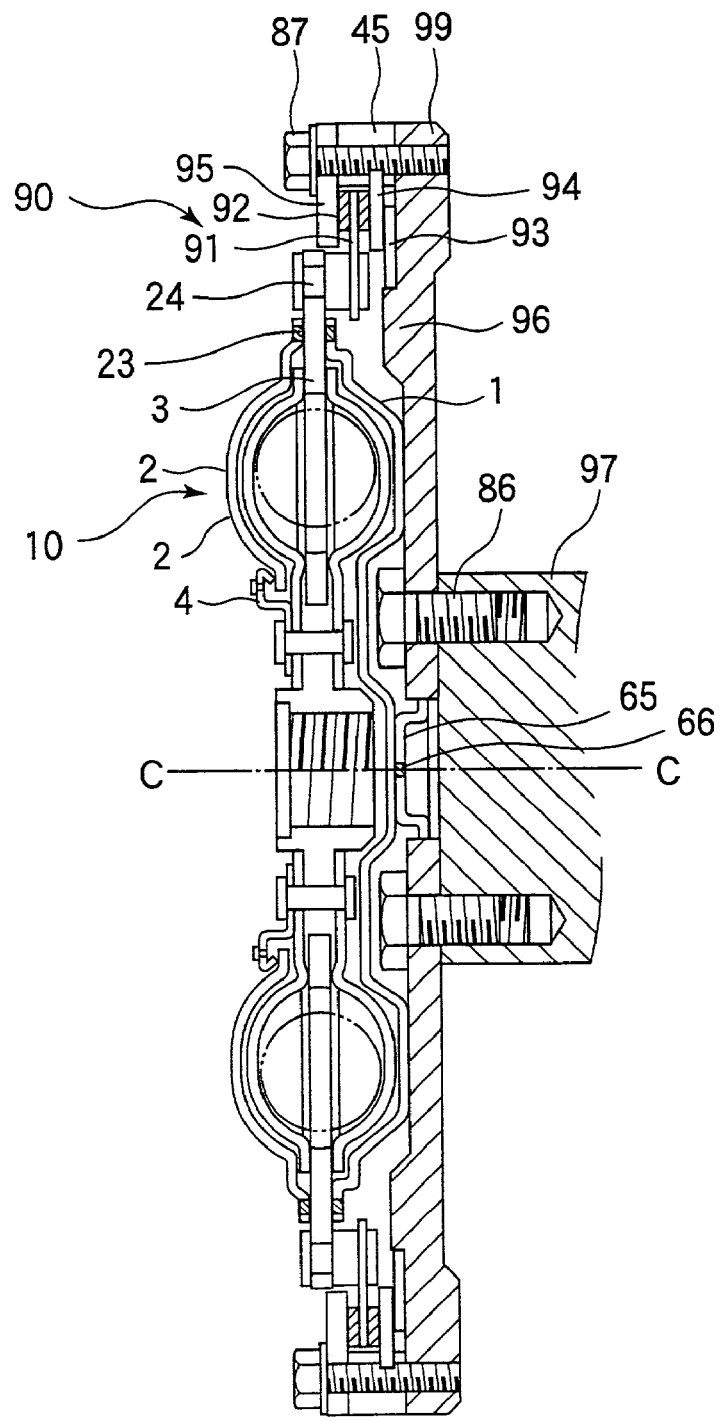
FIG. 1 is a sectional view of a first embodiment of the invention.
Figure 4:
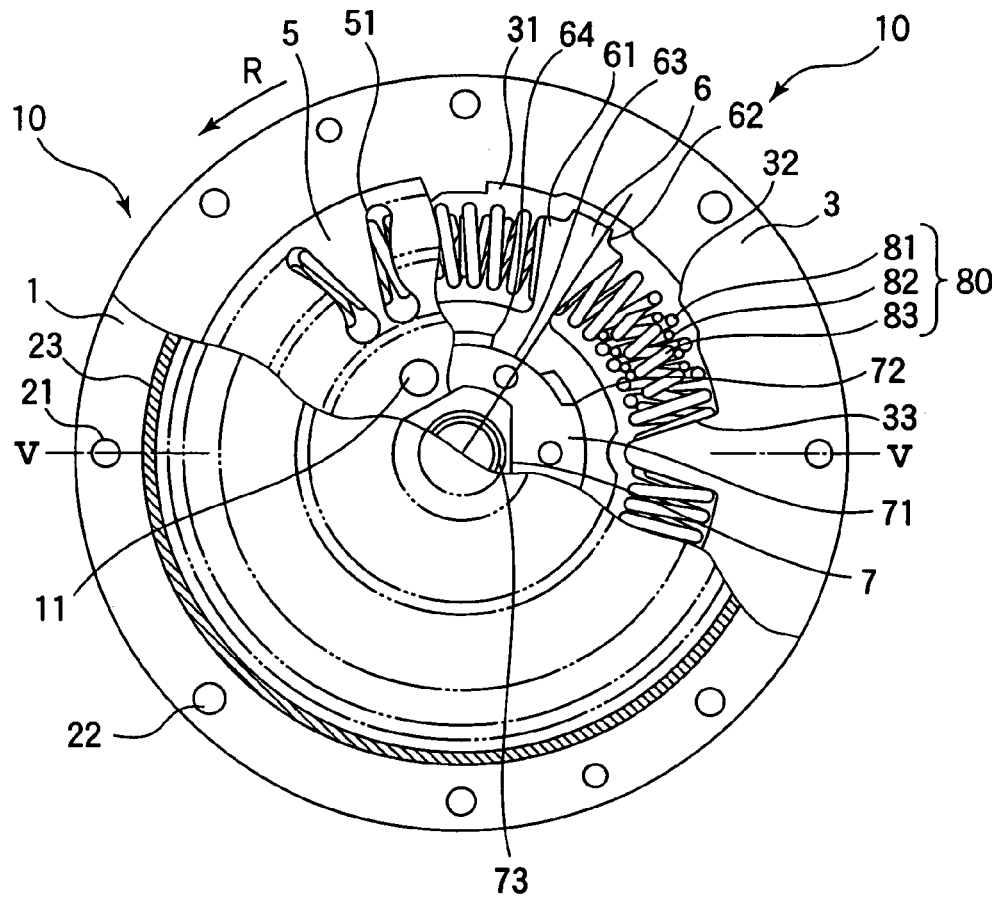
FIG. 4 is a front view showing a partially broken conventional damper assembly.
Figure 5:
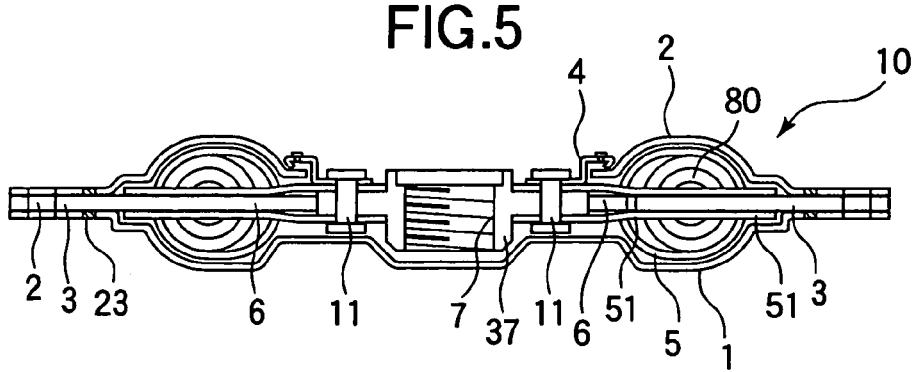
FIG. 5 is a sectional view cut along 5-5 line shown in FIG. 4.
Figure 6:
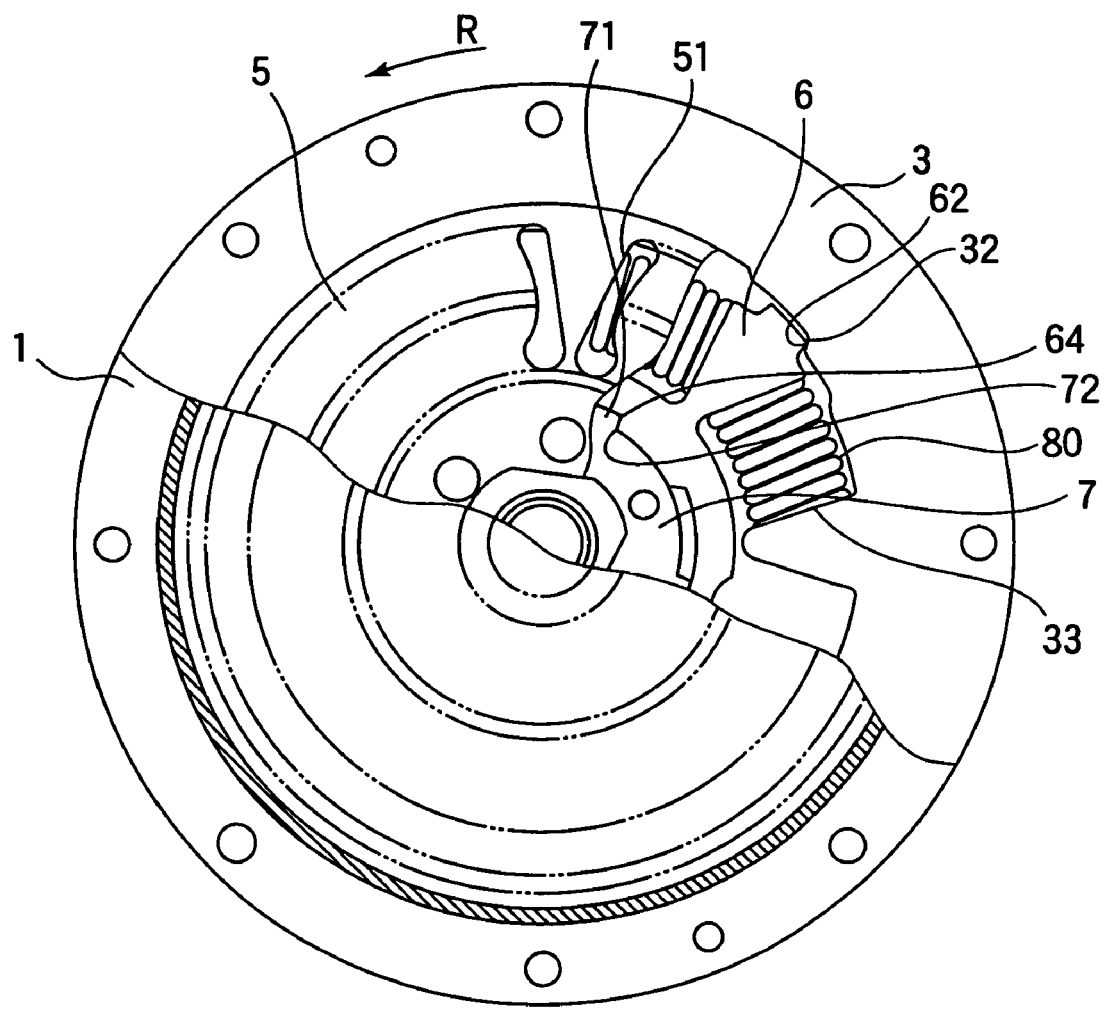
FIG. 6 is a front view similar to FIG. 1 showing a state of a large load imposed on a damper.

FIG. 1 is a sectional view of a first embodiment of the present invention, which is shown by the same sectional view of FIG. 5. The constitution itself and the action of the damper 10 are the same as those of the conventional damper as shown in FIGS. 4, 5 and 6. The torque limiter 90 of the first embodiment is a dry type frictional material, which is provided outside of the welding portion 23 to the front cover 1 of the damper 10 and the drive plate 3 of a rear cover 2, that is, outside of the airtight damper 10.

In the drawing, reference numeral 97 denotes an input shaft, reference numeral 96 a flywheel attached to the input shaft 97 by a bolt 86, reference numeral 45 a torque transmission member which is fixed between a torque transmission member attachment portion 99 and a support plate 95 of the flywheel 96. This torque transmission member 45 is provided at several places on the periphery portion of the flywheel 96.

Inside the torque transmission member 45, there is a spline portion 46, which is spline-engaged with a press plate 94. Reference numeral 93 denotes a press spring (dished head spring in the illustrated example), which presses the press plate 94 in the direction of the support plate 95. A torque transmission member plate 91 is held between the press plate 94 and the support plate 95 via a friction plate 92, and the torque transmission member plate 91 is fixed to the drive plate 3 by a rivet 24. The torque transmission member plate 91 and the drive plate 3 may be integrally formed.

Note that reference numeral 65 is welded to a front cover 1 so that the damper 10 does not deviate from the central line C-C and is a guide engaged with a hole of the inner periphery of the flywheel, and reference numeral 66 shows a welded portion.

A damper assembly of the first embodiment is constituted as described above, and since the press spring 93 presses against the press plate 94 and presses the torque transmission member plate 91 against the support plate 95 via the friction plate 92, the torque which is inputted from the input shaft 97 is transmitted to the drive plate 3 via the torque transmission member 45, the press plate 94, the friction plate 92 and the torque transmission member plate 91.

Note that the friction plate 92 may be fixed on one side or both sides of the torque transmission member plate 91 by adhesive agent or a rivet, or may be fixed to the support plate 95 or the press plate 94.

In the case where an excessive torque beyond an allowable value is imposed from an engine side, a slip occurs at a predetermined torque according to the strength of the press spring, and the excessive load to be imposed on a damper device can be prevented by liberating the excessive torque.

Figure 2:
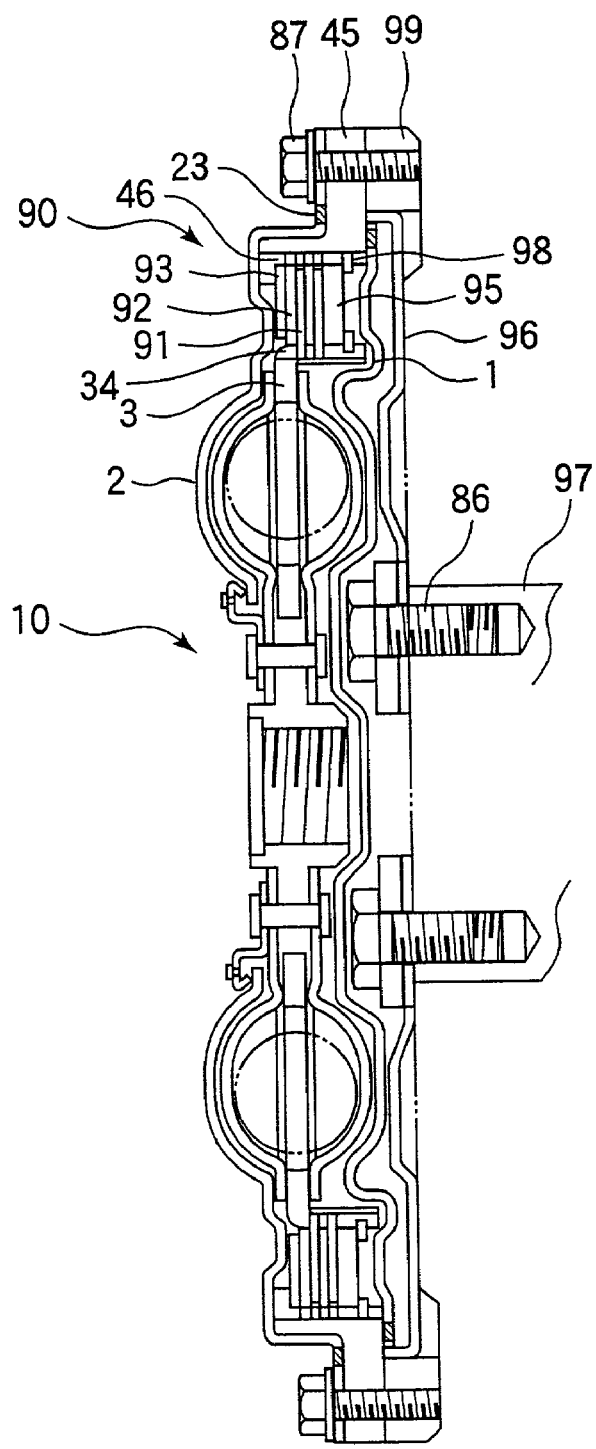
FIG. 2 is a sectional view of a second embodiment of the invention.

FIG. 2 shows a sectional view of a second embodiment where a torque limiter is provided in the interior of the airtight damper. In the drawing, the flywheel 96 is attached to the input shaft 97 by a bolt 86, and the torque transmission member attachment portion 99 is fixed to the outer periphery of the flywheel 96 by welding or the like, and the torque transmission member attachment portion 99 and the torque transmission member 45 are integrally fixed by a bolt 87. The torque transmission member 45 is welded to the front cover 1 and a rear cover 2. Reference numeral 23 denotes a welded portion.

The spline portion 46 of the torque transmission member 45 and the spline portion 34 formed on the drive plate outer periphery are spline-engaged with the friction plate 92 and the torque transmission member plate 91, respectively and are thrust toward the support plate 95 by the press spring 93. Reference numeral 98 denotes a retaining ring.

Similarly to the case of the first embodiment, the torque inputted from the input shaft is transmitted to the drive plate 3 by thrust generated by the press spring 93 for the friction plate 92 and the torque transmission member plate 91.

The torque limiter of a second embodiment is in the interiors of the front cover 1 and the welded portion 23 with the torque transmission member 45 of the rear cover 2, that is, it is provided in the interior of the airtight damper.

The interior surrounded by the front cover 1 and the rear cover 2 is filled with grease or the like and therefore the second embodiment is a wet frictional material type of a friction plate type.

Figure 3:
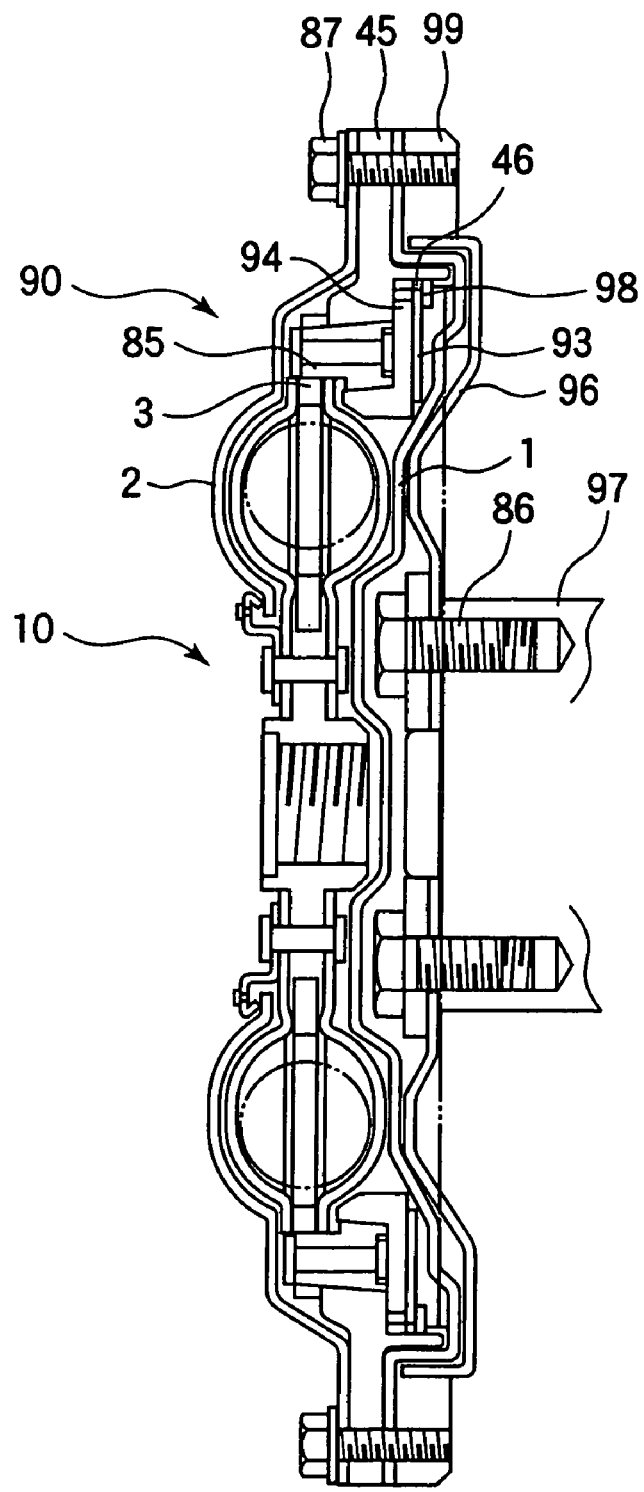
FIG. 3 is a sectional view of a third embodiment of the invention.

FIG. 3 is not the friction plate where the torque limiter is provided in the interior of the airtight damper, but the sectional view of a third embodiment of a conical ring type using a conical ring.

The torque transmission member attachment portion 99 is fixed to the outer periphery of the flywheel 96, which is attached to the input shaft 97 by the bolt 86 by welding or the like. The torque transmission member attachment portion 99, the torque transmission member 45, the front cover 1 and the rear cover 2 are integrally fixed by the bolt 87.

The torque transmission member 45 has a spline portion 46, with which a reversed L-shaped press plate 94 is spline-engaged, is thrust in the left direction of the drawing by the press spring 93. Reference numeral 98 denotes a retaining ring.

In a third embodiment, for example, a brass conical ring 85 penetrates the drive plate 3 and the torque transmission member 45, and is thrust by the press plate 94, and a torque is transmitted from the torque transmission member 45 to the drive plate 3 by the frictional surface of a conical shape of the outer periphery of the conical ring 85.

The damper assembly with torque limiter of the invention is constituted as described above, and even if a large rotational torque beyond an allowable value is imposed on fixed means by frictional force, a slip occurs at a predetermined torque decided by force of the press spring, so that an excessive load imposed on the damper device can be prevented.

What is claimed is:

1. A damper assembly with a torque limiter, said damper assembly having a single torque transmission path between an input axis and an output axis, and comprising:

a friction torque limiter between said input axis or said output axis and an airtight damper, said friction torque limiter being in series with said damper and limiting the torque which can be transmitted through said damper, wherein said friction torque limiter is disposed outside said airtight damper and includes a torque transmission plate fixed to a drive member of the damper, and a friction plate held in frictional engagement with said torque transmission plate by a press plate having a radially outermost peripheral portion spline engaged with a radially inner peripheral portion of a torque transmitting member and pressed toward said torque transmission plate by a press spring.

2. A damper assembly with a torque limiter, said damper assembly having a single torque transmission path between an input axis and an output axis, and comprising:

a friction torque limiter between said input axis or said output axis and an airtight damper, said friction torque limiter being in series with said damper and limiting the torque which can be transmitted through said damper, wherein said friction torque limiter is provided inside said airtight damper and includes a ring member having opposite axial end portions and a circumferential sidewall portion joining said opposite axial end portions, said circumferential sidewall portion having a conical periphery coaxial with a rotation axis of the damper assembly and providing a friction surface through which torque is transmitted in said friction path.

3. A damper assembly with a torque limiter according to claim 2, wherein said friction surface is a radially outer peripheral surface of said circumferential sidewall portion of said ring member.

4. A damper assembly with a torque limiter, said damper assembly having a single torque transmission path between an input axis and an output axis, and comprising:

a friction torque limiter between said input axis or said output axis and an airtight damper, said friction torque limiter being in series with said damper and limiting the torque which can be transmitted through said damper, wherein said friction torque limiter is provided inside said airtight damper and includes a ring member having opposite axial end portions and a circumferential sidewall portion joining said opposite axial end portions, said circumferential sidewall portion having a conical peripheral friction surface which is coaxial with a rotation axis of the damper assembly and frictionally engaged with an adjacent conical surface and through which torque is thereby transmitted in said friction path.

5. A damper assembly with a torque limiter according to claim 4, wherein said friction surface is a radially outer peripheral surface of said circumferential sidewall portion of said ring member.

6. A damper assembly with a torque limiter, said damper assembly having a single torque transmission path between an input axis and an output axis, and comprising:
 a friction torque limiter between said input axis or said output axis and an airtight damper, said friction torque limiter being in series with said damper, wherein said torque limiter is provided inside said airtight damper and includes a plurality of friction plates provided with wet-type friction material which limits the torque that can be transmitted through said damper.

7. A damper assembly with a torque limiter according to claim 6, wherein said friction plates are pressed by a spring.

8. A damper assembly with a torque limiter according to claim 7, wherein adjacent friction plates are arranged with a torque transmission plate disposed therebetween.

9. A damper assembly with a torque limiter according to claim 8, wherein said friction plates are spline engaged with one of a torque transmitting member and a drive plate of said airtight damper, and said torque transmission plate is spline engaged with the other of said torque transmitting member and said drive plate.

10. A damper assembly with a torque limiter according to claim 8, wherein said friction plates are spline engaged with a radially adjacent member.

* * * * *